Oct. 22, 1935.  S. WELDON  2,018,162

EGG SEPARATOR

Filed Jan. 11, 1935

Inventor:
Samuel Weldon
by

Patented Oct. 22, 1935

2,018,162

UNITED STATES PATENT OFFICE 2,018,162

EGG SEPARATOR

Samuel Weldon, Portland, Oreg.

Application January 11, 1935, Serial No. 1,371

2 Claims. (Cl. 146—2)

My invention relates specifically to that type of egg separator having for its purpose to facilitate the ready separation of the yolk from the white of an egg, as frequently required in the culinary art.

The object of my invention is to provide a convenient, simple, inexpensive and practical egg separator suitable for ordinary kitchen use; an egg separator adapted to be held over or seated on a cup, or glass, or other container, and further to provide an egg separator which can be quickly and easily cleaned.

The similar devices at present in use, as known to me, are, in my opinion, all more or less inefficient, in that the free flow and separation of the egg white from the egg yolk is interfered with, or impeded by the element supporting the yolk-holding bowl of the separator within the body thereof.

In brief, in said prior devices, the yolk-receiving bowl is supported within the body of the device by arms, or connections, which by their position, due to the viscosity and tendency of adherence of the white to the yolk, impede the separation of the white from the yolk by the influence of gravity, and thus render the separation of the yolk from the white slow and tedious.

To eliminate said objectionable feature, I have provided a device comprising an annular, cup-like body, and a yolk-receiving bowl of a size approximated to hold the yolk of the egg only, said bowl being supported centrally within, spaced from the encompassing wall portions of the body; the supporting element being arranged in the form of a pendent loop to provide a substantial clearance below the space between the bottom of the body and the adjacent side of the bowl, thus to permit gravity unimpeded to effect the flow, and separation of the white of the egg from its yolk; the body being preferably tapered towards the bottom so as to guide the contents of the egg to the said yolk-receiving bowl, thus to cause the yolk to become located in the latter, surrounded by the white, and causing the white to overflow the rim of said bowl into the container over which the egg separator is supported.

The above mentioned and other incidental features of my invention are hereinafter fully described with reference to the accompanying drawing, in which Fig. 1 is a top view of my separator shown placed over an open bowl or container;

Figure 1:
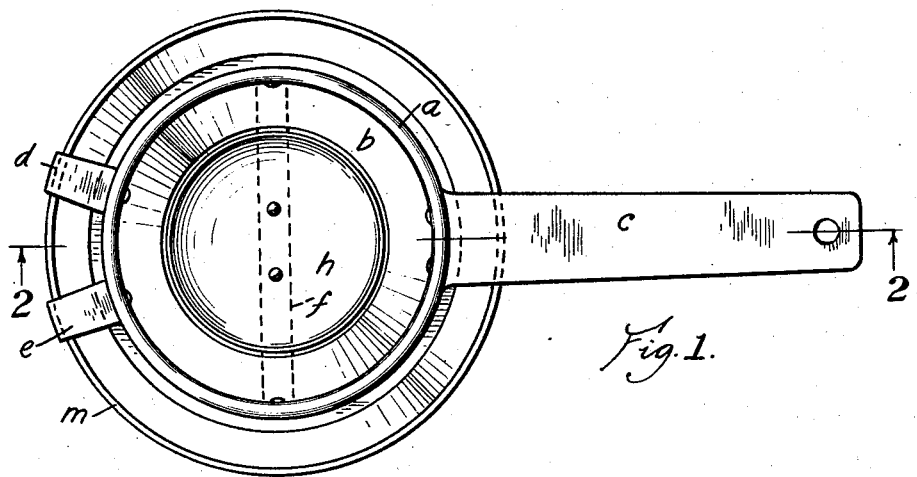
Figure 2:
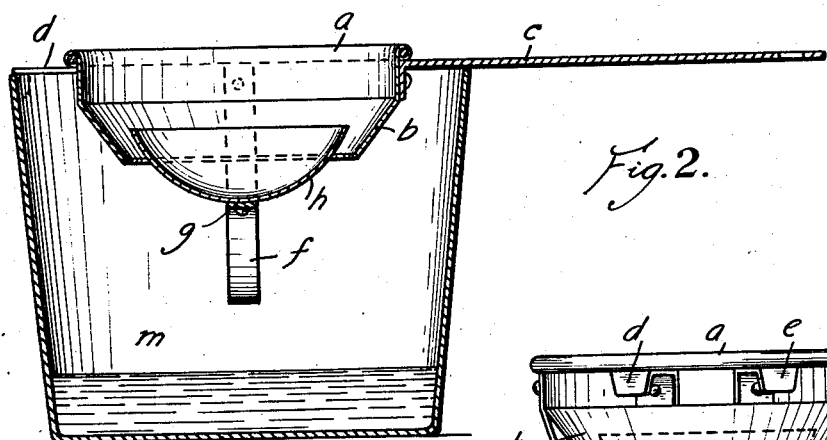
Fig. 2 is a vertical section on the line 2—2 of Fig. 1.
Figure 3:
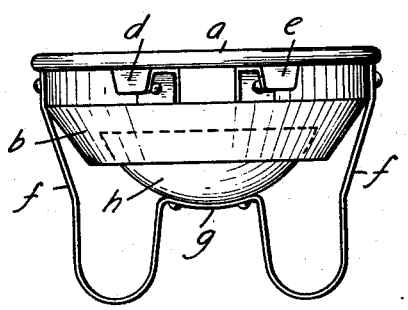
Fig. 3 is an end view of the separator.
Figure 4:
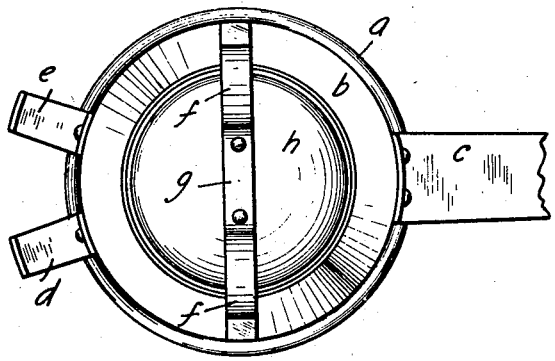
Fig. 4 is a bottom view of the separator.

The separator comprises an annular body $a$, and a yolk-receiving bowl $h$. The lower portion of the body $a$ is preferably funnel-shaped tapering inwardly as at $b$. To one side of the body $a$ is attached a handle $c$, and at the opposite side of a pair of claws or prongs $d$ and $e$ are attached and adapted to support one side of the separator by resting on the top of the brim of the bowl or container. At opposite sides on the outside of the body $a$ the ends of the bracket $f$ are attached. The bracket $f$ is shaped as shown in Fig. 3, and has a central, raised portion $g$ to which is attached the yolk-receiving bowl $h$. If preferred, however, the bracket $f$ could be made with only one loop instead of two, in which case one end of the bracket would be fastened to the body $a$ and the other end would be fastened to the center of bowl $h$ at the bottom, as at $g$. The bowl $h$ has its rim spaced from the lower tapering portion $b$ of the outer body $a$, so that the egg white flowing over the rim of the said bowl $h$ may be unimpeded in its passage between the bowl rim and the lower portion of the outside body and fall into the container $m$. Said bowl $h$ is made large enough to hold the yolk of an egg but not large enough to hold both the egg white and egg yolk.

The operation of my separator is as follows:

The egg is broken and opened above the bowl $h$ so that the egg yolk will fall in the bowl. Since the bowl is not large enough nor deep enough to hold the egg white, as well as the egg yolk, the egg white will run over the brim of the bowl $h$ and thus fall into the container $m$. If any portion of the brim of the bowl $h$ were connected with the wall of the outside body of the separator, an impediment to the free flow of the egg white over the brim would be caused, and, due to the viscosity of the albumen or egg white, any such impediment, even tho small in actual extent, might be sufficient to hold back a large portion of the egg white and thus prevent efficient separation of the egg white and egg yolk. As previously mentioned, this occurs with the egg separators now commonly found on the market. With my invention, however, this difficulty is completely eliminated by supporting my bowl $h$ at the bottom on the raised portion $g$ of the bracket $f$, thus leaving the brim of the said bowl entirely free and clear.

Without restricting myself to the details of construction of the elements of my invention, except as essential to its function, I claim:

1. A unitary egg separator consisting of an annular body, the lower portion thereof tapering downward, a yoke-receiving cup whose capacity is adapted to hold only, approximately, the yolk of the egg, said cup fixed concentrically within said tapered body portion, the bottom rim of said body being of slightly greater diameter than the rim of said yoke-cup, and the interior periphery of said tapered body portion being spaced from the circumference of said yolk-cup to form around the latter an annular, narrow passageway, a bracket rigidly supporting said yolk-cup in place, said bracket of narrow cross-section, the opposite ends thereof being fastened to the upper portion of said body, and depending part spaced laterally from said tapered lower portion of the body, said yolk-cup being secured to the central portion of said bracket, and the portions of the latter intermediate its said points of connection being arranged in two pendent loops of substantial length on each side of the yolk-cup, thus placing only negligible obstructions in the way of the white of the egg dropping from the separator.

2. A unitary egg separator consisting of an annular body, the lower portion thereof tapering downward, means for supporting said body on the rim of a receptacle, a yolk-receiving cup whose capacity is adapted to hold only, approximately, the yolk of the egg, said cup fixed concentrically within said tapered body portion, the bottom rim of said body being of slightly greater diameter than the rim of said yolk-cup, and the interior periphery of said tapered body portion being spaced from the circumference of said yolk-cup to form around the latter an annular, narrow passageway, a bracket rigidly supporting said yolk-cup in place, said bracket of narrow cross-section, the opposite ends thereof being fastened to the upper portion of said body, and depending part spaced laterally from said tapered lower portion of the body, said yolk-cup being secured to the central portion of said bracket, and the portions of the latter intermediate its said points of connection being arranged in two pendent loops of substantial length on each side of the yolk-cup, thus placing only negligible obstructions in the way of the white of the egg dropping from the separator.

SAMUEL WELDON.